(12) United States Patent
Wagner

(10) Patent No.: US 9,026,908 B2
(45) Date of Patent: May 5, 2015

(54) SYSTEMS AND METHODS FOR PROVIDING SIMULTANEOUS ACCESS TO DOCUMENTS

(75) Inventor: Timothy A. Wagner, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1555 days.

(21) Appl. No.: 10/983,812

(22) Filed: Nov. 8, 2004

(65) Prior Publication Data

US 2005/0262432 A1    Nov. 24, 2005

Related U.S. Application Data

(60) Provisional application No. 60/573,078, filed on May 22, 2004.

(51) Int. Cl.
 G06F 17/00    (2006.01)
 G06F 17/24    (2006.01)
 G06F 9/44     (2006.01)
 G06F 17/22    (2006.01)

(52) U.S. Cl.
 CPC ........ *G06F 17/24* (2013.01); *G06F 8/71* (2013.01); *G06F 17/2288* (2013.01)

(58) Field of Classification Search
 CPC .................. G06F 17/24; G06F 17/2288
 USPC ........... 715/501.1, 513, 205, 234, 229; 707/203, 206
 See application file for complete search history.

(56) References Cited

U.S. PATENT DOCUMENTS

| | | | | |
|---|---|---|---|---|
| 5,890,177 A * | 3/1999 | Moody et al. | ............. | 715/210 |
| 6,061,697 A * | 5/2000 | Nakao | ............. | 715/513 |
| 6,931,590 B2 * | 8/2005 | Kanie et al. | ............. | 715/234 |
| 2001/0011263 A1 * | 8/2001 | Klug | ............. | 707/1 |
| 2002/0010711 A1 * | 1/2002 | Nakanishi et al. | ......... | 707/501.1 |
| 2002/0065848 A1 * | 5/2002 | Walker et al. | ............. | 707/511 |
| 2004/0230894 A1 * | 11/2004 | Elza et al. | ............. | 715/511 |

OTHER PUBLICATIONS

Nguyen, Dung "Lab 14: Finite State Machine and Lexical Analysis", Nov. 30, 2003, pp. 1-2, http://www.owlnet.rice.edu/~comp212/03-fall/labs/14/.*

* cited by examiner

*Primary Examiner* — Cesar Paula
*Assistant Examiner* — David Faber
(74) *Attorney, Agent, or Firm* — Miles & Stockbridge P.C.

(57) ABSTRACT

A system and method for representing immutable versions of a document that can be simultaneously accessed by a plurality of processes.

28 Claims, 9 Drawing Sheets

SYSTEMS AND METHODS FOR PROVIDING SIMULTANEOUS ACCESS TO DOCUMENTS

CLAIM OF PRIORITY

This application claims priority from the following application, which is hereby incorporated by reference in its entirety: U.S. Provisional Application No. 60/573,078, entitled SYSTEMS AND METHODS FOR EFFICIENTLY MANAGING VERSIONED DYNAMIC DOCUMENTS, by Timothy Wagner, filed on May 22, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

The following document is incorporated by reference in its entirety:

Tim A. Wagner, Practical Algorithms for Incremental Software Development Environments (1998) (Masters thesis, University of California, Berkeley).

FIELD OF THE DISCLOSURE

This disclosure relates to providing simultaneous, non-blocking access to documents by multiple processes. In particular, systems and methods are presented for efficiently providing a plurality of versions of a document.

BACKGROUND

Dynamic analysis of documents has become an important part of many computer programs. Word processors perform spell checking, autocorrect spelling mistakes and analyze the grammar of sentence as a user types a document. Software editors dynamically color-code program text as a programmer types. Interactive development environments (IDEs), and the parsers that underlie them, go a step further to perform lexical analysis on code and statement completion as a programmer types. These types of programs, which we will generically refer to as editors, all share the need to incrementally execute logic over a stable snapshot of a document as it is being modified.

Interactive editors share the characteristic that there is real-time input or modifications to a document taking place. Editors use separate processes to provide additional features in a responsive fashion. Although the remainder of this disclosure provides examples in terms of "processes", the present disclosure is not limited to or dependent upon any particular unit of execution. Thus, the term "process" can mean a unit of any granularity of execution, including but not limited to a running program, function, thread, processor level thread, a remote procedure call to another machine, or other computing operation.

One or more processes are responsible for receiving user input and displaying it in the editor, and building the document. Additional background processes execute other features like auto-correction, statement completion, and color coding. This provides the user with a more responsive user interface experience, but it increases the complexity of the editor's implementation because the data entered by the user must be read and analyzed simultaneously by a number of different processes.

When data is accessed by multiple processes, synchronization is normally used to ensure that data written by one process isn't inadvertently overwritten by another process. In addition, synchronization ensures that processes analyzing the document have a stable, unchanging version to work from. This allows one process to obtain exclusive access to the data in order to make changes or complete an analysis. In this manner, only a single process may be modifying the resource at a given time and only when no readers have the document locked for analysis.

Synchronization requires each process to participate in a scheme where the process may obtain a lock on the data. While locks guarantee that a process has exclusive access to the data, locks can also result in poor performance. Processes may lock data for a long period of time, forcing other processes to wait to access the data and slowing the performance of the system. This is particularly problematic when one or more of the processes waiting to access the data is responsible for updating the display and accepting user input since the user's terminal effectively becomes inoperable during lengthy or frequent locking periods. Deadlocks can also occur in which two or more processes wait to access data locked by another process. This also can adversely impact performance and response time since deadlocks usually require a timeout before the process decides to release its locks and try again.

Synchronization also increases code complexity. The code must be carefully written to avoid holding locks too long and starving other processes from executing. Poor synchronization can also introduce additional bugs, the nature of which may be only detectable at runtime. Synchronization bugs are also notoriously difficult to reproduce, resulting in end users experiencing the adverse effects of a synchronization problem.

In addition, it is often desirable for an application to hold multiple versions of the underlying document. For example, the application may need to compare the current version of the document with a previous version or implement an undo stack for reversing changes to a document. But keeping previous versions of a document is resource intensive and presents the problem of knowing when processes are no longer interested in the certain versions of the document and when those versions can be discarded.

In theory, it is possible to address the issues outlined in this section by simply copying all or part of the document whenever a process requires access. However, there are two downsides to this approach which make it undesirable. First, it can require a lot of memory to maintain the separate copies. And second, it can take a lot of time to copy the data e.g. when new versions are required. The deficiencies of this approach get worse as the size of the data increases. An editor's response time decreases and the developer's user experience becomes less desirable.

BRIEF DESCRIPTION OF THE DRAWINGS

FIG. 9 depicts how the document (901) and other processes (909) use the version management system as well the insertion (903), deletion (905) and garbage collection (911) of information and versions (v1, v2) in the data structure (907).

DETAILED DESCRIPTION

Figure 1:
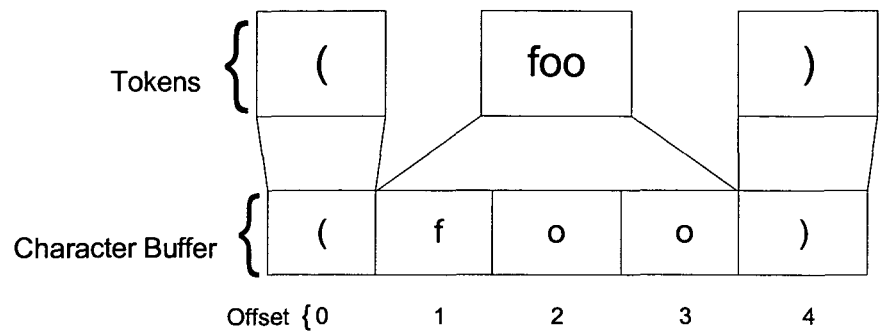
FIG. 1 is an illustration of an exemplary ordered list of tokens in accordance to one embodiment of the invention.

Aspects of the invention are illustrated by way of example and not by way of limitation in the figures of the accompanying drawings in which like references indicate similar elements. It should be noted that references to "an" or "one" embodiments in this disclosure are not necessarily to the same embodiment, and such references mean at least one. In the following description, numerous specific details are set forth to provide a thorough description of the invention. However, it will be apparent to one skilled in the art that the invention may be practiced without these specific details. In other instances, well-known features have not been described in detail so as not to obscure the invention.

The present disclosure includes systems and methods that efficiently provide access to successively updated versions of a document as it is modified by various processes. The term "document," for the purposes of this disclosure means any file or other information, persisted in a machine readable medium such as a computer memory, hard disk, removable media or other suitable storage means, and capable of being accessed or used in some manner by a process. Examples of documents include but are not limited to program source code files, word processing files, databases, computer aided design (CAD) files, sound files, image files, multimedia files, and spreadsheets. The term "version" of a document, for the purposes of this disclosure, refers to a representation of a document after one or more modifications have been made to the document.

In one embodiment, a new version of a document can be created when a process wishes to modify the document. New versions can be made immutable in order to avoid the problem of locking outlined above. By "immutable," it is meant that a version of a document remains constant and unchanged as various processes access it. It is also meant that subsequent changes to the document won't affect immutable versions, rather new versions can be created. For example, a user interface process in an editor can create new versions of a text document as the user adds, deletes or modifies text in the document. These new versions can be immutable in order to allow any process to read them without the use of semaphores or other locking mechanisms. In one embodiment, immutable data can be optimized for read access allowing processes to operate freely on the document.

As more and more versions are maintained, the storage space required to maintain multiple versions of a document can grow large, especially for large documents. In one embodiment, to avoid keeping a complete copy of the document with each version common parts of the document are stored once and referenced by multiple versions. As new versions of the document are created, common parts are reused in the new version.

As the common parts of a document are modified and new versions are created, the system can maintain common subsets of information in the document between different versions in order to reduce the required memory. A common subset may require common parts of the document to be split into smaller sub-parts which can be referenced by different versions. The process of splitting the common parts creates a new version but can also maintain all old versions.

Maintaining common subsets also makes it a trivial to determine whether any two versions contain the same parts of the document. As an example, if two versions reference the same subset, then both versions contain the parts of the document which are represented by that subset. This inquiry can be further expanded to determine whether two or more versions contain any of the same parts of a document or to check which parts of a document are contained in any two or more versions.

In one embodiment, it is possible to manage the lifetime of different versions of a document and reclaim versions as they become obsolete. This can be accomplished by using a standard garbage collection algorithm or other suitable algorithm. By way of illustration, complete versions of the document and the parts they contain that are not referenced elsewhere can be discarded when the last reference to the version object is removed. This makes it possible to automatically reclaim old versions once all processes operating on them are no longer interested. As used in this disclosure, "reclaiming" includes but is not limited to dropping, freeing, removing, compressing or storing the obsolete version in another location.

In one embodiment, this approach can also be applied to parts of the document that have been deleted from one or more versions. A document part is not discarded until all references to it are removed. This may hold even if the last version of the document referencing the part is removed. Said differently, document parts can live longer than the versions which reference them provided a reference to the part is maintained by some process. In one embodiment, this process can be handled by the garbage collection facility of the host platform or language. (e.g. Java®).

In one embodiment, processes detect when new versions are available through a notification from the system. A "notification" can be any message or piece information sent to a process, informing it that a new version of the document has been created. Many types of notification systems are known in the art and various such systems can be implemented for the purposes of this disclosure. For example, a process could be notified by other processes, signals, log files, status queues, client/server communications as well as other forms of notification systems. The present disclosure is not limited to or dependent on any one notification system, known or yet to be developed.

When a new version of a document is created, a process can access the version and process it. For example, as a software developer or a process makes changes to source code in the editor, a user interface process in the editor creates a new version of the document. The process that performs syntax and semantic analysis on the code is notified by the system that the new version exists. It can then analyze the new version to determine if the developer has introduced any errors with the changes.

In one embodiment, a token represents any portion of a document. A token stream is an ordered plurality of tokens. For example, a token stream can be generated from lexical analysis of the document to represent parts of the document. In modern IDEs, lexical analysis is performed incrementally as a software developer types. Each increment represents a slightly different version as the developer adds, deletes, and modifies the code. Syntax analyzers and type checkers read the token stream to evaluate the correctness of the code and provide feedback to the developer.

In one embodiment, a token stream is represented as a set of tokens which describe the strings, operators, and other constructs used within a programming language. FIG. 1 depicts an example token stream and its corresponding character buffer that might result from the user typing the text "(foo)" into an IDE editor. As the user types in the characters "(foo)" the IDE creates new tokens, each containing a part of the text. As illustrated, the first token may contain the character with the offset[0] of the character buffer, the next token contain the characters with the offsets[1-3] and the last token contain the character with the offset[4].

Figure 2:
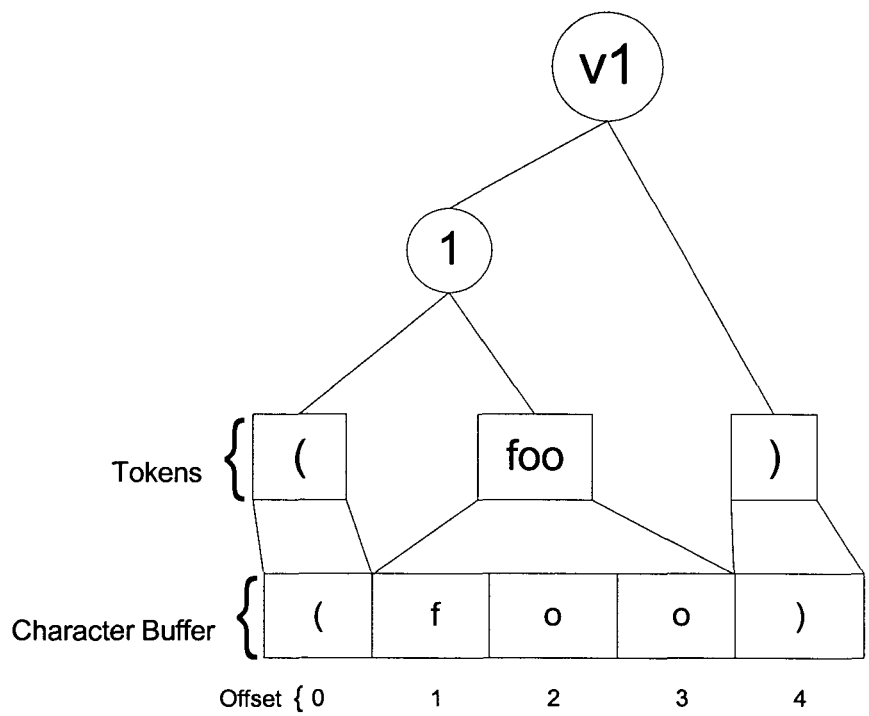
FIG. 2 is an illustration of an exemplary immutable version associated with the list of tokens illustrated in FIG. 1 and in accordance to one embodiment of the invention.

When the IDE can marks a token stream as complete, an immutable version is created. In one embodiment, the version can be represented as a binary tree with the tokens as its leaf nodes. FIG. 2 depicts a version of the token stream in a binary tree. Since three tokens have thus far been inserted into the document, version 1 (v1) contains the three tokens illustrated in FIG. 1. Note that a common subset (1) of the first two tokens may be maintained for use by later versions, for the purpose of saving storage capacity. The binary tree type of structure would allow other processes to access the tokens in version 1 (v1) of the token stream in order by performing a depth first traversal of the resulting tree structure. An ordered binary tree structure can be used so that search operations on the tree run in O(logN) time where N is the number of nodes in the tree. Leaf nodes can be labeled with the offset in the character buffer where the associated token begins. Interior nodes within the tree can be labeled with the offset in the character buffer where their rightmost child node begins. For example, the "(" token is at offset [0], the "foo" token is at offset [1] and the ")" token is at offset [4]. As such, the token at a particular position within the binary tree can be located with a binary search.

Continuing the example, the developer may modify the document by adding code using the IDE. For example, the concatenation operator (+) and the string "bar" could be inserted immediately after the string "foo" inside the parentheses. In one embodiment, this would generate the set of tokens and corresponding character buffer depicted in FIG. 3. Note that two new tokens have been created in FIG. 3, one containing the text "+" and the other containing the text "bar".

In one embodiment, the version management system inserts these new tokens into the token stream to represent this modified version of the code. In one embodiment, this is accomplished by creating a new version of the document and inserting the new tokens into the associated tree as children of the new version. The version creation process ensures that the previously created immutable version, for example v1, remains consistent as other processes may be reading it. Intermediary nodes are introduced to the tree that group tokens in the appropriate order.

Figure 4:
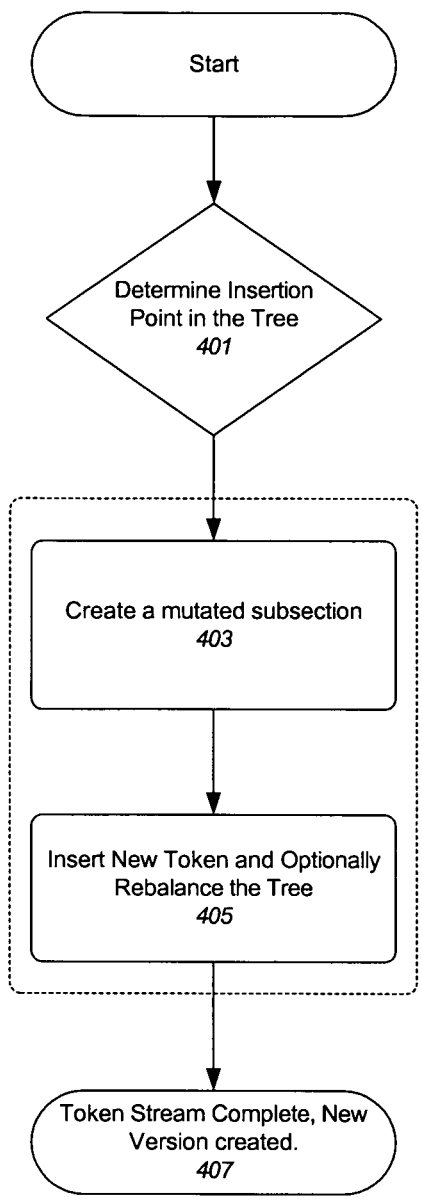
FIG. 4 is a flow diagram of an exemplary algorithm used to insert a new token into the binary tree thereby causing a new version of the binary tree to be created in accordance to one embodiment of the invention.

FIG. 4 is a flow diagram illustration of an algorithm used to create a new version of the token stream in accordance to various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways. In this flow diagram, inserting tokens is specified by the following steps:

In step (401), the binary tree is traversed using a binary depth-first search to find the token which occurs immediately to the right of the inserted token(s) within the character buffer based on the insertion position. This locates the insertion point in the tree for the new node. For non-textual information, an assumption is made that the information can be represented in a serial fashion. Binary search algorithms on binary trees are well known in the prior art. While traversing the tree, an ordered list of the visited nodes can be maintained.

In step (403), starting with the root node, each node is copied in the ordered list of visited nodes (i.e., on the path from the root to the parent of the token following the insertion point) to create a mutated subsection. For each node, copy the node and connect it with its parent node in the same position as the node that was copied (e.g., if the original node was the left child of its parent, the copy should be connected as the left child of its parent) This creates a new version of the token stream that shares nodes it has in common with the previous version of the token stream.

In step (405), the new token is inserted into the tree using a standard binary tree insertion algorithm as is well known in the art. The tree can be rebalanced (optional) using balancing algorithms as are well known in the art. In one embodiment, the process of creating the mutated subsection and the rebalancing process are not independent. There are various ways to handle this; rebalancing hypothetically, then cloning nodes as necessarily on the minimal spanning tree of the (hypothetically) affected nodes and the root is one possible algorithm. Other algorithms that do both simultaneously are well known in the art.

In step (407), once the new tokens have been inserted, the token stream can be deemed complete, creating a second immutable version of the tree. This algorithm is efficient and yields a time complexity of $O(logN+IlogI)$ where N is the number of nodes and I is the number of insertions.

Figure 3:
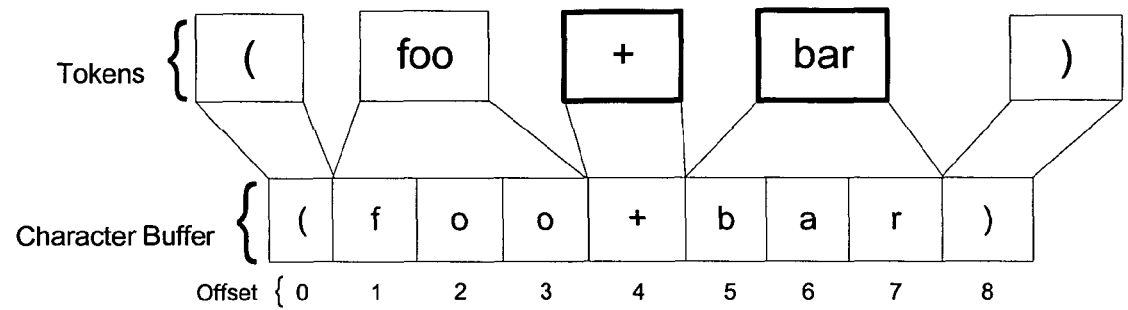
FIG. 3 is an illustration of an exemplary ordered list of tokens that can result from inserting two new tokens into the list of tokens illustrated in FIG. 1 in accordance to one embodiment of the invention.
Figure 5:
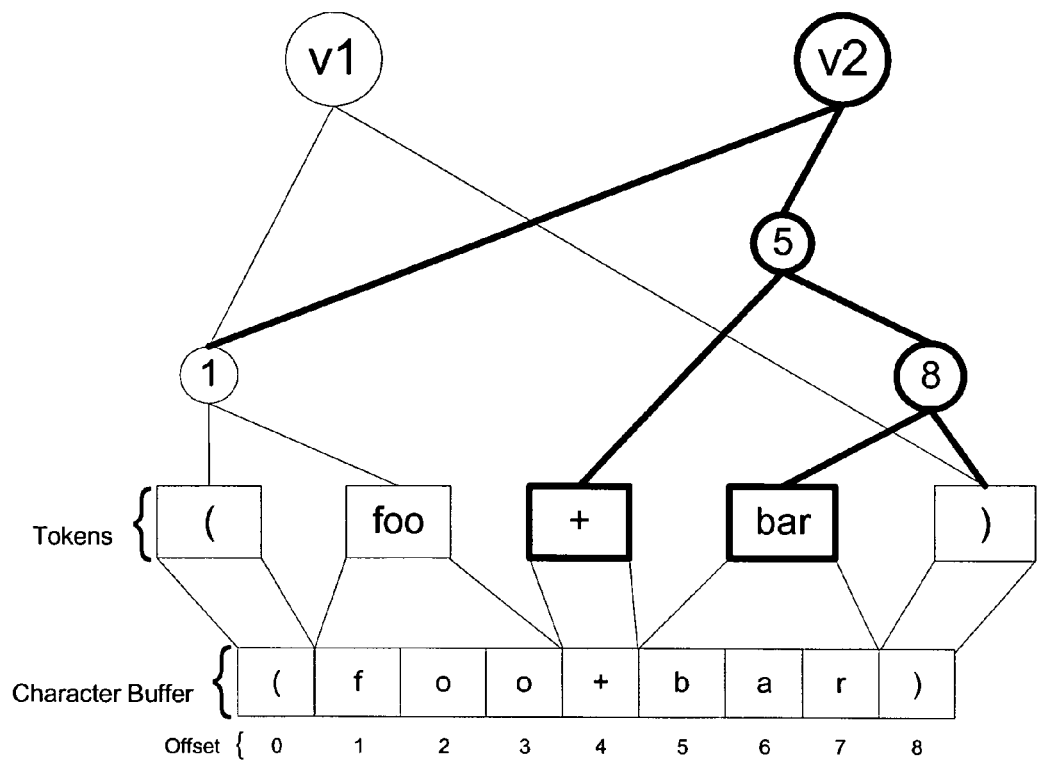
FIG. 5 is an illustration of exemplary tree structures that can be used to maintain two versions of the immutable token stream for the list of tokens illustrated in FIGS. 1 and 3 in accordance to one embodiment of the invention.

For example, FIG. 5 depicts a token stream with two versions that might result from inserting the tokens depicted in FIG. 3, via the algorithm depicted in FIG. 4, into the token stream depicted in FIG. 2. The two versions share a node (1) representing the portions of the text buffer the versions have in common. Any number of processes can continue using version 1 (v1) without locking the token stream or otherwise disrupting other processes operating on the token stream.

Figure 6:
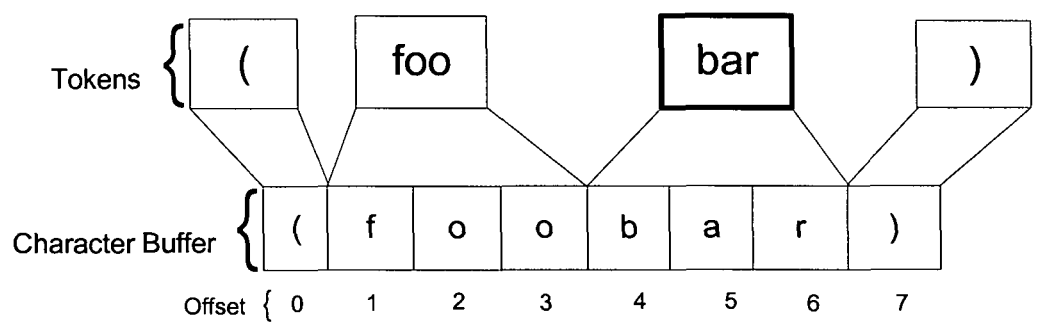
FIG. 6 is an illustration of an exemplary ordered list of tokens that can result from deleting a token from the list of tokens illustrated in FIG. 3 in accordance to one embodiment of the invention.

Continuing the example, the developer may remove the concatenation operator ("+") between the two literal strings "foo" and "bar". In one embodiment, this would generate a new set of tokens as depicted in FIG. 6.

In one embodiment, this edit causes the version management system to build a third version of the token stream that omits the concatenation operator. Note that the token for the concatenation operator is not deleted immediately because it is still needed by previous versions of the token stream. After all the versions of the token stream that reference the token for the concatenation operator are discarded and there are no more references to this token, it can be discarded by the garbage collector.

Figure 7:
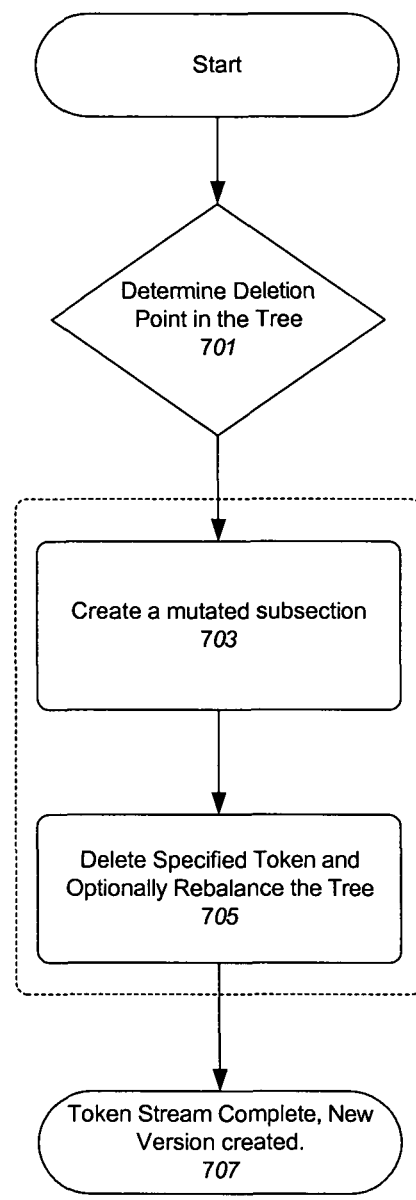
FIG. 7 is a flow diagram of an exemplary algorithm used to delete a token from the binary tree thereby causing a new version of the binary tree to be created in accordance to one embodiment of the invention.

FIG. 7 is a flow diagram illustration of an algorithm used to create a new version of the token stream by deleting a token, in accordance to various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways. In this flow diagram, deleting tokens is specified by the following steps:

In step (701), the binary tree is traversed using a depth-first binary search to find the token to be deleted based on its position in the text buffer. Once again, for non-textual information, an assumption is made that the information can be represented in a serial fashion. During the search, maintain an ordered list of the visited nodes from the root to the token.

In step (703), starting with the root node, each child node in the ordered list of visited nodes is copied (i.e., on the path from the root node to the grandparent of the token to be deleted) to create a mutated subsection. For each node, copy the node and connect it with its parent node in the same position as the node that was copied. (e.g., if the original node was the left child of its parent, the copy should also be the left child of its parent).

In step (705), the requested node is deleted from the new version of the token stream in accordance with binary tree algorithms as are well known in the art. The tree can be rebalanced (optional) using balancing algorithms as are well known in the art. In one embodiment, the process of creating the mutated subsection and the rebalancing process are not independent. There are various ways to handle this; rebalancing hypothetically, then cloning nodes as necessarily on the minimal spanning tree of the (hypothetically) affected nodes and the root is one possible algorithm. Other algorithms that do both simultaneously are well known in the art.

In step (707), once the new tokens have been deleted, the token stream can be deemed complete, creating another immutable version of the tree. This algorithm is efficient and yields a time complexity of $O(\log N + I \log I)$ where N is the number of nodes and I is the number of deletions.

Figure 8:
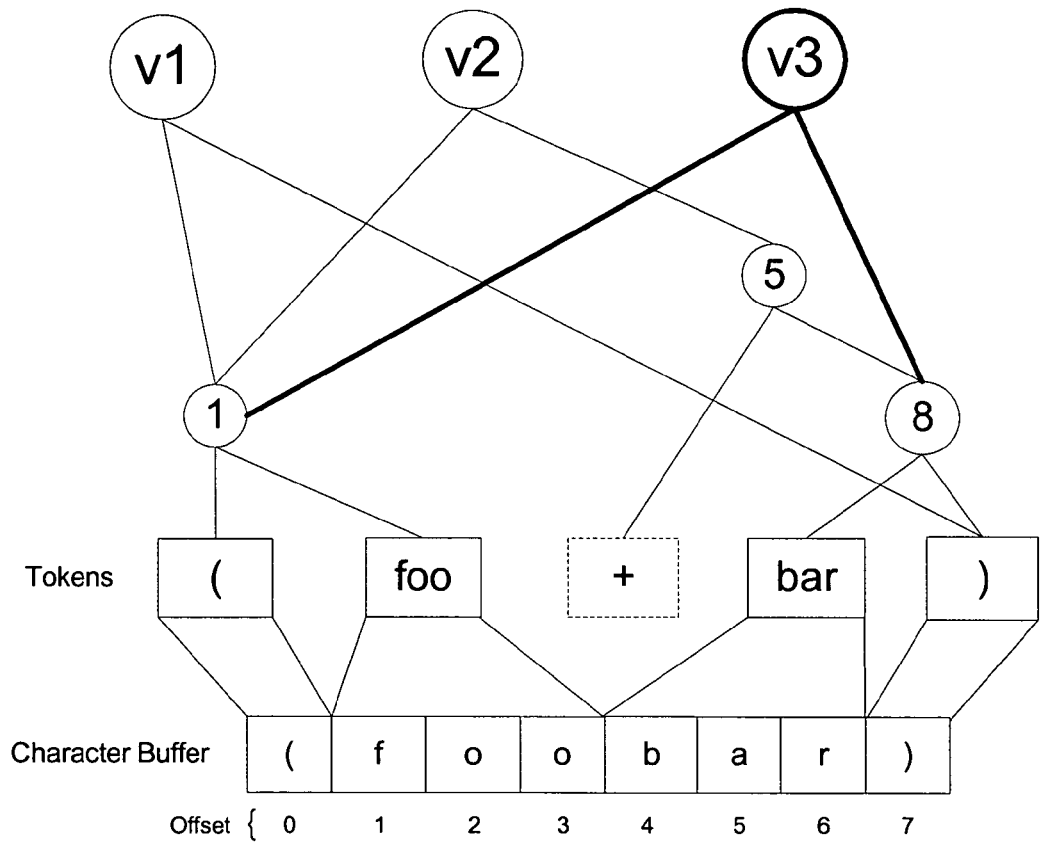
FIG. 8 is an illustration of exemplary tree structures used to maintain three versions of the immutable token stream for the list of tokens illustrated in FIGS. 1, 3, and 6 in accordance to one embodiment of the invention.

FIG. 8 depicts the a token stream with three versions that may result from deleting the token representing the concatenation operator from the token stream represented in FIG. 5, via the algorithm depicted in FIG. 7. All three versions (v1, v2, v3) share node (1), representing the portions of the text buffer they have in common. Version v2 and v3 share node (8) which represents the portion of the text that v1 and v2 have in common. Any number of processes can continue using any of these versions without locking the token stream or otherwise disrupting other processes operating on the token stream.

In one embodiment, reusing the existing tokens and intervening nodes from previous versions of the token stream can achieve space efficiency by limiting the space complexity for storing versions of the tree to $O(\log N + I \log I)$ where N is the number of nodes and I is the number of deletions, insertions or modifications to existing tokens.

Figure 9:
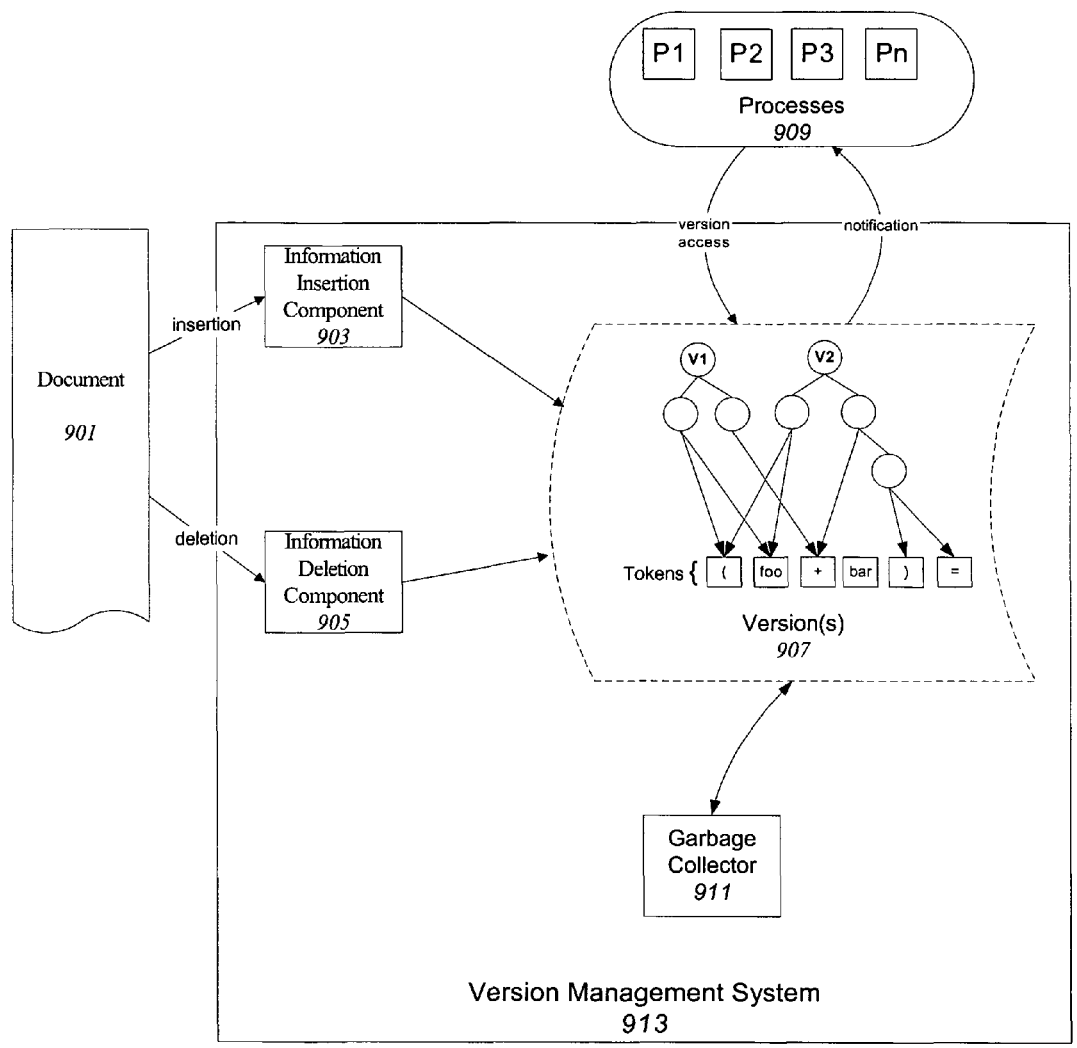
FIG. 9 is an illustration of the overall functionality of the version management system.

FIG. 9 illustrates an exemplary version management system in accordance to various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In FIG. 9, as a document (901) is being modified, modifications can take the form of either an insertion (903) or deletion (905) of information. These insertions and deletions result in new versions (v1, v2) being created as well as new tokens of the document being stored (in case of insertion). A plurality of processes (909) can access the tokens of the document through the use of versions. An unlimited number of versions can be created, system resources permitting. These new versions can be immutable as previously described, for example they may be implemented as read-only files. Whenever a new version of a document is created, the plurality of processes can be notified by the system that a new version exists. Processes that subsequently need access to the document, can then use the new version to access the document. Various different systems of notification are available in the art and many of them can be implemented, as previously described. For example the system can update a status queue of all available versions by inserting a new version into the queue. The garbage collector (911) can free up storage space by cleaning up versions that are no longer needed and removing tokens that are no longer referenced by any version. In one embodiment, once a version is no longer being accessed by any of the processes the garbage collector may remove that version and remove such tokens which are unique to the version being removed. However, the present invention is not limited to this particular form of garbage collection technique, many alternatives are known in the art and they can be implemented for the purposes of this disclosure.

Figure 10:
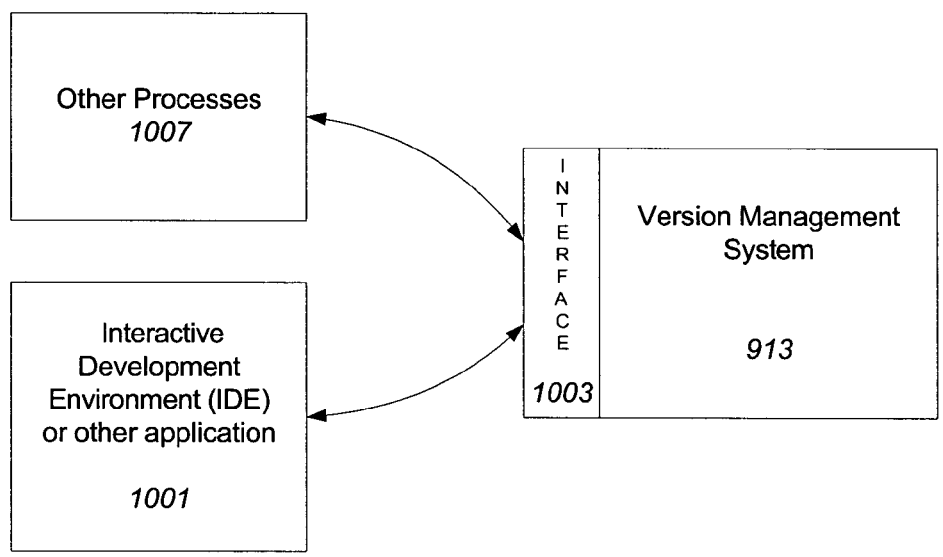
FIG. 10 is an illustration of an exemplary version management system interacting with an IDE (interactive development environment) or some other application, as well as other processes that need simultaneous access to documents, through some form of an interface, in accordance to one embodiment of the invention.

FIG. 10 is an illustration of an overall implementation of the version management system. The version management system (1005) can be used by an interactive development environment (1001) as well as other applications or processes that would have need for simultaneous access to a file by several processes. The version management system can be deployed as a stand-alone program or as a resource (e.g. library or an object) or it may be integrated into a process. It can also be deployed as a web-based application, which can be accessed by, for example, sending XML messages over common web protocols such as the simple object access protocol (SOAP). However the examples of these implementations are not meant to be exhaustive. Many more could be employed by one of ordinary skill in the art of software development.

The interface (1003) between the version management system and any application or process which desires to use it, can be any type of interface implementation such as an Application Programming Interface (API). Thus, the sharing of data between applications and the version management systems can take the forms of remote procedure calls (RCPs), standard query language (SQL) queries, file transfer, message deliveries as well as other types of communication.

Whenever a new version of the document is created within the version management system, the interface can provide the functionality of sending notifications to other processes (1007) which may require access to the document being modified. These notifications can be implemented as RCPs, SQL queries, file transfers and message deliveries as described above. These examples are of course not a complete list of all means of notifications and sharing of data. It will be apparent to those skilled in the art that alternatives are possible.

The foregoing examples illustrated the token stream as being contained in a binary tree object. However, a binary tree is not necessary for this disclosure. Any containment structure can be used, such as an acyclic graph or a list.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which is a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); and any type of media or device suitable for storing instructions and/or information. Various embodiments include a computer program product that can be transmitted in whole or in parts and over one or more public and/or private networks wherein the transmission includes instructions and/or information which can be used by one or more processors to perform any of the features presented herein. In various embodiments, the transmission may include a plurality of separate transmissions.

Stored one or more of the computer (e.g. machine) readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers and remote software to do the function. The invocations or calls can include invocations or calls in distributed and client/server systems.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented method for representing versions of a document that can be accessed by a plurality of processes, comprising:
   detecting a first set of modifications to the document;
   creating a first immutable version of the document that is a representation of the document with the first set of modifications;
   detecting a second set of modifications to the document; and
   creating a second immutable version of the document that is a representation of the document with the second set of modifications;
   wherein common parts of the document shared by the first and second versions are not duplicated and are split into smaller sub-parts which operates to be referenced by different versions;
   wherein the plurality of processes are permitted to access one of the first version and the second version at any time and without preventing other processes in the plurality of processes from accessing that same version simultaneously;
   wherein the document includes a token stream of tokens that represent information of the document, and the plurality of processes are permitted to use one of the first version and the second version without disrupting the other processes from operating on the token stream; and
   wherein an immutable version of a document is a version that remains constant and unchanged as the plurality of processes access the version.

2. The computer-implemented method of claim 1, further comprising:
   providing a notification to one or more of the plurality of processes when a new version of the document is created.

3. The computer-implemented method of claim 1, further comprising:
   reclaiming versions that are no longer referenced by the plurality of processes.

4. The computer-implemented method of claim 1, wherein:
   an immutable version cannot be changed once it has been created.

5. The computer-implemented method of claim 1, wherein:
   the document includes at least one of textual and graphical information.

6. The computer-implemented method of claim 1, wherein:
   the token stream is generated from lexical analysis of the document.

7. The computer-implemented method of claim 6, wherein:
   the token stream is represented as leaves in a tree data structure.

8. The computer-implemented method of claim 1, wherein:
   the method steps of claim 1 are performed in conjunction with an Integrated Development Environment (IDE), wherein the IDE is configured to create new tokens.

9. The computer-implemented method of claim 1 wherein:
   a process is a thread.

10. The computer-implemented method of claim 1, further comprising:
determining whether two versions contain the same parts of the document by detecting whether two versions of the document reference the same subset of tokens.

11. A computer system including instructions stored in a memory that cause a processor to represent versions of a document that can be accessed by a plurality of processes, the computer system comprising:
a processor;
a data structure representing a plurality of immutable versions of a document, wherein common parts of the document shared by multiple versions are not duplicated and are not permitted to be split into smaller sub-parts which operates to be referenced by different versions;
an information insertion component creating a representation of a first version of a document within the data structure that is a representation of the document based on first information inserted into the document; and
an information deletion component creating a representation of a second immutable version of a document within the data structure that is a representation of the document based on second information deleted from the document;
wherein the plurality of processes are permitted to access one of the first version and the second version at any time and without preventing other processes in the plurality of processes from accessing that same version simultaneously;
wherein the document includes a token stream of tokens that represent information of the document, and the plurality of processes are permitted to use one of the first version and the second version without disrupting the other processes from operating on the token stream; and
wherein an immutable version of a document is a version that remains constant and unchanged as the plurality of processes access the version.

12. The system of claim 11 wherein:
information is not duplicated between any two versions of a document in the data structure.

13. The system of claim 11 further comprising:
a garbage collector component that reclaims versions of the document in the data structure.

14. The system of claim 11 wherein:
the data structure comprises a binary tree.

15. The system of claim 11 wherein:
the token stream is generated from lexical analysis of the document.

16. The system of claim 15, further comprising:
a garbage collector component reclaims a token of a document from the data structure when no more versions reference the token.

17. The system of claim 16, wherein:
the data structure is a binary tree; and
the tokens are leaf nodes in the binary tree.

18. The system of claim 11 wherein:
a notification is provided to at least one of the plurality of processes when a new version of the document is created.

19. The system of claim 11, further comprising:
an Interactive Development Environment (IDE), wherein the IDE is configured to create new tokens.

20. A non-transitory machine readable medium having instructions stored thereon that, when executed by a processor, cause the processor to:
detect a first set of modifications to a document;
create a first immutable version of the document that is a representation of the document with the first set of modifications;
detect a second set of modifications to the document;
create a second immutable version of the document that is a representation of the document with the second set of modifications;
wherein common parts of the document shared by the first and second versions are not duplicated and are split into smaller sub-parts which operates to be referenced by different versions;
wherein the plurality of processes are permitted to access one of the first version and the second version at any time and without preventing other processes in the plurality of processes from accessing that same version simultaneously;
wherein the document includes a token stream of tokens that represent information of the document, and the plurality of processes are permitted to use one of the first version and the second version without disrupting the other processes from operating on the token stream; and
wherein an immutable version of a document is a version that remains constant and unchanged as the plurality of processes access the version.

21. The non-transitory machine readable medium of claim 20 wherein: a notification is provided to at least one of the plurality of processes when a new version of the document is created.

22. The non-transitory machine readable medium of claim 20 wherein: versions that are no longer referenced by the plurality of processes are reclaimed.

23. The non-transitory machine readable medium of claim 20 wherein: an immutable version cannot be changed once it has been created.

24. The non-transitory machine readable medium of claim 20 wherein: the token stream is generated from lexical analysis of the document.

25. The non-transitory machine readable medium of claim 24 wherein: the token stream is represented as a tree.

26. The non-transitory machine readable medium of claim 20 wherein: the document is being modified via an Interactive Development Environment (IDE), wherein the IDE is configured to create new tokens.

27. The non-transitory machine readable medium of claim 20 wherein: a process is a thread.

28. The computer-implemented method of claim 1, wherein:
at least one of the smaller sub-parts of the common parts of the document is referenced by a third immutable version of the document that is a representation of the document with a third set of modifications.

* * * * *

UNITED STATES PATENT AND TRADEMARK OFFICE
CERTIFICATE OF CORRECTION

PATENT NO.        : 9,026,908 B2                                             Page 1 of 1
APPLICATION NO.   : 10/983812
DATED             : May 5, 2015
INVENTOR(S)       : Wagner It is certified that error appears in the above-identified patent and that said Letters Patent is hereby corrected as shown below:

Specification

In column 1, line 28, delete "(Masters" and insert -- (Master's --, therefor.

In column 5, line 57, delete "") "token" and insert -- ")" token --, therefor.

In column 7, line 52, delete "the a" and insert -- the --, therefor.

Signed and Sealed this
Ninth Day of February, 2016

Michelle K. Lee
*Director of the United States Patent and Trademark Office*